United States Patent [19]

Aoshima et al.

[11] Patent Number: 4,677,231
[45] Date of Patent: Jun. 30, 1987

[54] PROCESS FOR PURIFICATION OF POLYETHER

[75] Inventors: Atsushi Aoshima, Yokohama; Setsuo Yamamatsu; Shoichiro Tonomura, both of Fuji, all of Japan

[73] Assignee: Asahi Kasei Kogyo Kabushiki Kaisha, Japan

[21] Appl. No.: 798,249

[22] Filed: Nov. 8, 1985

[30] Foreign Application Priority Data

Nov. 13, 1984 [JP] Japan .................. 59-237491
Nov. 14, 1984 [JP] Japan .................. 59-238651
Nov. 20, 1984 [JP] Japan .................. 59-243206

[51] Int. Cl.$^4$ .................. C07C 41/38; C07C 41/36
[52] U.S. Cl. .................. 568/617; 568/621
[58] Field of Search .......... 568/621, 624, 625, 617; 528/491, 497, 498, 502

[56] References Cited

U.S. PATENT DOCUMENTS 2,751,419 6/1956 Hill et al. .
4,137,396 1/1979 Louvar et al. .................. 568/621 X
4,460,796 7/1984 Mueller .................. 568/621 X
4,480,124 10/1984 Mueller .................. 568/621 X
4,500,705 2/1985 Copelin .................. 568/621 X
4,528,364 7/1985 Prier .................. 568/621 X

FOREIGN PATENT DOCUMENTS 55-165918 12/1980 Japan .
56-16524 2/1981 Japan .

Primary Examiner—Howard T. Mars
Attorney, Agent, or Firm—Finnegan, Henderson, Farabow, Garrett & Dunner

[57] ABSTRACT

A process for purifying a polyalkylene ether, which comprises mixing a polyalkylene ether or a mixture of a polyalkylene ether and an organic solvent containing a heteropoly acid and/or its salt with at least one solvent for purification selected from hydrocarbons having 3 to 15 carbon atoms or halogenated hydrocarbons having 1 to 15 carbon atoms and separating by precipitation the phase composed mainly of the heteropoly acid and/or its salt, and a process wherein the polyalkylene ether or a mixture of a polyalkylene ether and an organic solvent containing a heteropoly acid and/or its salt is brought into contact with a solid adsorbent capable of adsorbing the heteropoly acid and/or its salt in the presence of at least one solvent for purification as described above, either further after the separation according to the process described above, or in the state unseparated.

According to the present invention, the heteropoly acid and/or its salt dissolved in the polyalkylene ether or the mixture of the polyalkylene ether with the organic solvent can be removed efficiently in the form which can be reused. Further after the treatment with an adsorbent, the concentration of heteropoly acids in the polyalkylene ether can be reduced to extremely lower.

24 Claims, No Drawings

PROCESS FOR PURIFICATION OF POLYETHER

DESCRIPTION

1. Technical Field

The present invention relates to a process for purifying a polyalkylene ether by separating and recovering a heteropoly acid and/or its salt from a polyalkylene ether or a mixture of a polyalkylene ether with an organic solvent containing a heteropoly acid and/or its salt. The present invention provides a process for purifying a polyalkylene ether by separating and recovering heteropoly acids dissolved from a polymerizing solution containing the main components of a polyalkylene ether and an unreacted monomer obtained by a polymerization with heteropoly acids as a catalyst.

2. Background Art

Polyalkylene ethers are recently highlighted as the starting material for Spandex, polyurethane elastomers, polyester elastomers, etc., their amounts used are simply increasing and various improvements have been attempted in a production process and a purification process.

Among them, there is recently reported a process for synthesis of a polyalkylene ether by a polymerization of a cyclic ether such as tetrahydrofuran (hereinafter abbreviated as THF) with the use of a heteropoly acid as the catalyst (U.S. Pat. Appln. Ser. No. 610,741). According to this process, after the reaction, most of the catalyst can be easily recovered from the polymerizing solution by way of phase separation, and yet the process has the advantage of being capable of using the catalyst in recycle. However, since the catalyst is partially dissolved in the polymerizing solution, in order to obtain a high purity polymer and lower the production cost of a polymer, it is required to perform the operations for separation and recovery of the catalyst dissolved in the polymerizing solution.

Ordinarily, for removal of the acid catalyst in the polymer, there is employed the method such as extraction with water, or filtration or washing of the salt formed with addition of a basic substance. However, there is a strong interaction between a polyalkylene ether and a heteropoly acid, and hence an extraction with water cannot remove the catalyst efficiently but requires a large amount of water. Further, a polyalkylene ether will readily form an emulsion with water, whereby the problem is caused that phase separation can be effected with difficulty. Also, when a neutralization reaction is carried out, an expensive heteropoly acid becomes no longer available for reuse to result disadvantageously in increased cost for a production of the polymer.

Further, even when washing with water or a neutralization with a basic substance may be performed, it is very difficult to reduce a heteropoly acid to 0.1 wt. % or less, particularly 0.01 wt. % or less based on a polyalkylene ether.

In the light of the state of the art as described above, the present inventors have made intensive studies about a process for removing efficiently a heteropoly acid in a polyalkylene ether, and consequently found a phenomenon that the heteropoly acid is precipitated when a specific solvent for purification is added into the polyalkylene ether.

And, further, various methods for effectively removing the heteropoly acid remaining minutely in a polyalkylene ether even after the above treatment have also been investigated. As a consequence, it has been found that, by treatment with the use of an adsorbent in co-presence of a specific solvent for purification, heteropoly acids can be removed to a very low concentration. The present invention has been accomplished on the basis of such findings.

DISCLOSURE

The present invention provides a process for purifying a polyalkylene ether, which comprises mixing a polyalkylene ether or a mixture of a polyalkylene ether and an organic solvent containing a heteropoly acid and/or its salt (hereinafter sometimes abbreviated as "heteropoly acids") with at least one solvent for purification selected from hydrocarbons having 3 to 15 carbon atoms or halogenated hydrocarbons having 1 to 15 carbon atoms (hereinafter sometimes abbreviated as "a solvent for purification") and separating the phase composed mainly of the heteropoly acid and/or its salt, and, if desired, thereafter bringing the polyalkylene ether or the mixture of a polyalkylene ether and an organic solvent containing heteropoly acids into contact with a solid adsorbent capable of adsorbing the heteropolyacids in the presence of the above-described solvent for purification.

The heteropoly acid and its salt in the present invention refers comprehensively to oxy acids formed by condensation of at least one oxide of Mo, W and V with oxy acids of other elements such as P, Si, As, Ge, B, Ti, Ce, Co, etc. and salts of the oxy acids, the atomic ratio of the former to the latter being 2.5 to 12.

Examples of these heteropoly acids and its salts may include 12-molybdophosphoric acid, 5-molybdo-2-phosphoric acid, 12-tungstophosphoric acid, 12-molybdotungstophosphoric acid, 6-molybdo-6-tungstophosphoric acid, 12-molybdovanadophosphoric acid, 11-molybdo-1-vanadophosphoric acid, 12-molybdotungstovanadophosphoric acid, 12-tunstovanadophosphoric acid, 12-molybdoniobophosphoric acid, 12-tungstosilicic acid, 12-molybdosilicic acid, 12-molybdotungstosilicic acid, 12-molybdotungstovanadosilicic acid, 12-tungstoboric acid, 12-molybdoboric acid, 12-molybdotungstoboric acid, 12-molybdovanadoboric acid, 12-molybdotungstovanadoboric acid, 9-molybdonickelic acid, 6-molybdocobaltic acid, 6-tungstocobaltic acid, 11-molybdoarsenic acid, 12-tungstoarsenic acid, 12-tungstogermanic acid, 18-tungsto-2-arsenic acid, 18-molybdo-2-phosphoric acid, 9-molybdophosphoric acid, 18-tungsto-2-phosphoric acid, 12-titanomolybdic acid, 12-ceriomolybdic acid, 18-molybdo-2-phosphoric acid and salts thereof.

Among them, preferable examples include 12-molybdophosphoric acid, 18-molybdo-2-phosphoric acid, 9-molybdophosphoric acid, 12-tungstophosphoric acid, 18-tungsto-2-phosphoric acid, 11-molybdo-1-vanadophosphoric acid, 12-molybdotungstophosphoric acid, 6-molybdo-6-tungstophosphoric acid, 12-molybdotungstovanadophosporic acid, 12-tungstovanadophosphoric acid, 12-molybdosilicic acid, 12-tungstosilicic acid, 12-molybdotunstosilicic acid, 12-molybdotungstovanadosilicic acid, 12-tungstoboric acid, 12-molybdoboric acid, 12-molybdotungstoboric acid, 12-molybdovanadoboric acid, 12-molybdotungstovanadoboric acid, 12-tungstogermanic acid and 12-tungstoarsenic acid.

The kinds of the salts are not particularly limited. For example, there may be employed metal salts of the metals belonging to the group I of the periodic table such as Li, Na, K, Rb, Cs, Cu, Ag, Au, etc., of the group II such as Mg, Ca, Sr, Ba, Zn, Cd, Hg etc., of the group III such as Sc, La, Ce, Al, Ga, In, etc., of the group VIII such as Fe, Co, Ni, Ru, Pd, Pt, etc. and other metals such as Sn, Pb, Mn, Bi, etc., or ammonium salts, amine salts and others.

Typical examples of these salts may include 12-tungstophosphate-1-lithium ($LiH_2PW_{12}O_{40}$), 12-tungstophosphate-2-lithium ($Li_2HPW_{12}O_{40}$), 12-tungstophosphate-1-sodium ($NaH_2PW_{12}O_{40}$), 12-tungstophosphate-2-sodium ($Na_2HPW_{12}O_{40}$), 12-tungstophosphate-2-potassium ($K_2HPW_{12}O_{40}$), 12-tungstophosphate-2-cesium ($Cs_2HPW_{12}O_{40}$), 12-tungstophosphate-2-silver ($Ag_2HPW_{12}O_{40}$), 12-tungstophosphate-1-magnesium ($MgHPW_{12}O_{40}$), 12-tungstophosphate-1-calcium ($CaHPW_{12}O_{40}$), 12-tungstophosphate-1-zinc ($ZnHPW_{12}O_{40}$), 12-tungstophosphate-1-nickel ($NiHPW_{12}O_{40}$), 12-tungstosilicate-1-nickel ($NiH_2SiW_{12}O_{40}$), 12-tungstosilicate-2-lithium ($Li_2H_2SiW_{12}O_{40}$), 12-tungstosilicate-2-silver ($Ag_2H_2SiW_{12}O_{40}$), 12-tungstosilicate-1-magnesium ($MgH_2SiW_{12}O_{40}$), 12-tungstosilicate-1-aluminum ($AlHSiW_{12}O_{40}$), 12-tungstosilicate-1-indium ($InHSiW_{12}O_{40}$), 12-tungstosilicate-1-gallium ($GaHSiW_{12}O_{40}$), 12-molybdophosphate-1-lithium ($LiH_2PMo_{12}O_{40}$), 12-molybdophosphate-1-magnesium ($MgHPMo_{12}O_{40}$), 12-tungstophosphate-2-ammonium (($NH_4$)$_2HPW_{12}O_{40}$), 12-tungstosilicate-1-tetramethylamine ($N(CH_3)_4H_3SiW_{12}O_{40}$), 12-tungstophosphate-1-iron ($FePW_{12}O_{40}$), 12-tungstophosphate-1-bismuth ($BiPW_{12}O_{40}$), 12-tungstophosphate-1-aluminum ($AlPW_{12}O_{40}$), 12-tungstophosphate-1-chromium ($CrPW_{12}O_{40}$), 12-tungstophosphate-1-gallium ($GaPW_{12}O_{40}$), 12-tungstophosphate-1-indium ($InPW_{12}O_{40}$) and the like.

The heteropoly acid and/or its salt may be either alone or a mixture of two or more kinds. The amount of the heteropoly acids to be dissolved is preferably from 0.001% by weight to 50% by weight, more preferably 0.001% by weight to 10% by weight, based on the polyalkylene ether or the mixture of the polyalkylene ether and the organic solvent.

The polyalkylene ether in the present invention is a polymer having polyoxyalkylene chains of the formula:

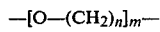

(wherein $n \geq 1$, $m \geq 2$) or polyoxyalkylene chains having substituents such as alkyl group, halogenated alkyl group, etc. in the molecule, which is not particularly limited. Its molecular weight is not particularly limited, but preferably within the range from 500 to 5000. Such polymers may include polymers of THF, copolymers of THF with other cyclic ethers, copolymers of THF with polyhydric alcohols, and the like. Further, copolymers of THF with other cyclic ethers and polyhydric alcohols may also be included.

The organic solvent mixed with the polyalkylene ether is not particularly limited, but it is possible to exemplify cyclic ethers, polyhydric alcohols which are the monomers constituting the polyalkylene ether or alcohols generally employed as polymerization terminators. Also, water may be contained in a small amount.

The polymerization mixture obtained by the reaction of THF alone or THF with a cyclic ether, THF with a polyhydric alcohol or THF with a cyclic ether and a polyhydric alcohol with the use of heteropoly acids as polymerization catalysts is a suitable example, and the fact that the polymerization as described above proceeds is disclosed in the above-identified patent application and in the U.S. Pat. Appln. Ser. No. 716,656.

The polymerization mixture obtained by the above polymerization reaction is frequently separated into two phases comprising the phase composed mainly of the polymer and the unreacted monomer and the phase composed mainly of the heteropoly acid catalyst and, in this case, the present process may be applied to the polymerization mixture from which the catalyst phase has been previously removed. The reaction mixture in the above applications contains generally 0.1 to 3% by weight of heteropoly acids dissolved therein.

Examples of hydrocarbons having 3 to 15 carbon atoms or halogenated hydrocarbons having 1 to 15 carbon atoms to be used for the precipitation of heteropoly acids ("solvents for purification") are cyclopentane, cyclohexane, cycloheptane, cyclooctane, methylcyclo-pentane, methylcyclohexane, chlorocyclohexane, propane, butane, pentane, hexane, heptane, octane, nonane, decane, undecane, dodecane, chloroform, trichlorotrifluoroethane, trichlorofluoromethane, benzene, toluene, chlorobenzene, and the like. Propane, butane, etc. are required to be handled under pressurization. Particularly preferred are pentane, hexane, heptane, octane, nonane, decane, undecane, dodecane, cyclohexane, cyclopentane, cyclooctane, cyclononane and cyclodecane, since they have higher function of precipitating heteropoly acids effectively even in small amounts.

When the present process is to be applied for a reaction mixture comprising a polyalkylene ether and unreacted THF, for recovery of the unreacted THF from a solvent for purification added, the solvent for purification should preferably have a boiling point higher than THF and not form an azeotropic mixture therewith. Although n-hexane has been known to form an azeotropic mixture with THF, n-heptane, octane and nonane are found in the present invention to form no azeotropic mixture with THF. Further, since these solvents can be rather easily recovered from the mixture with polyalkylene ether, n-heptane, octane and nonane are particularly preferred as the solvent. A solvent having 16 or more carbon atoms is not preferred, because it has a high boiling point and can be recovered by separation from a polyalkylene ether with difficulty. Even when no azeotropic mixture may be formed, a solvent having not more than 7 carbon atoms requires a large number of necessary stages of a rectifying tower, and, although depending on the amount of the hydrocarbon employed, the liquid within or at the bottom of the rectifying tower sometimes separates into two phases, that is, the polyalkylene ether phase and the hydrocarbon phase. When the separation into two phases occurs within the rectifying tower, the stage efficiency is decreased and also undesirable foaming will readily occur. When using octane or nonane, two phase separation within the rectifying tower will hardly occur and therefore octane and nonane are most preferred as the solvent.

The details about the function of precipitating heteropoly acids are not clear, but it may be estimated that low solubility of heteropoly acids in the above-described solvent for purification and an appropriate compatibility of the solvent for purification with a polyalkylene ether are each one of causes therefor.

The amount of the solvent for purification to be used for preciptiation of heteropoly acids depends on the coexisting amounts of organic solvents such as unreacted monomers, but may generally be at least equal to, preferably two-fold or more of the weight of organic solvents such as unreacted monomers. Also, it is added in an amount generally of 0.5-fold or more, preferably 1.0-fold or more, relative to the polyalkylene ether. When the content of the organic solvents such as unreacted monomers is small, the solvent for purification added may sometimes cause a phase separation from the polyalkylene ether phase, but the effect is small even if the solvent for purification may be used in an amount over the amount which will cause a phase separation.

When organic solvents such as unreacted monomers coexist in large amounts, a large amount of the solvent for purification is required to be used for precipitation of heteropoly acids. For this reason, it is preferable to recover at least a portion of the organic solvent to concentrate the mixture to a content of organic solvents of 90 wt. % or less, more preferably 50 wt. % or less, before adding the solvent for purification to precipitate heteropoly acids.

For mixing of the solvent for purification, a conventional stirring means, a static mixer, etc. may be used. After mixing, the mixture may be left to stand, whereby the phase consisting mainly of heteropoly acid or its salt is precipitated to form two phases together with the polymer solution phase. In the phase consisting mainly of heteropoly acids of the lower phase, a small amount of polymer and organic solvents such as unreacted monomers and a very minute amount of the solvent for purification are contained, although the amounts may differ more or less depending on the practicing conditions.

Mixing and standing may be carried out at a temperature at which the operation can easily be done within the range which will not coagulate the polymer. If the temperature is too high, the solubility of the heteropoly acid is increased and therefore no higher temperature than necessary should be used. Generally, the operations are practiced at 25° to 60 ° C. The mixture may be left standing for about 0.1 hour to 100 hours. The standing time can be shortened by use of a coalescer, a liquid cyclone, a centrifugal machine, etc. Also, by filtration by use of a membrane filter, the catalyst can be separated. On completion of a phase separation, the lower phase containing heteropoly acids at a high concentration is separated from the upper phase. By removing the organic solvents and the solvent for purification by an appropriate method such as distillation, polymers having decreased concentration of heteropoly acids can be obtained. The lower phase can be reused as such as the polymerization catalyst.

When the upper phase consists mainly of a polyalkylene ether, THF and a hydrocarbon solvent for purification which has a higher boiling point than THF and does not form an azeotropic mixture therewith, although somewhat different depending on the amount of the solvent for purification, only THF can be recovered from the rectifying tower and the remaining mixture can be separated by cooling at an appropriate temperature into two phases of the phase consisting mainly of the polyalkylene ether and the phase consisting mainly of the solvent for purification, whereby most of the solvent for purification can be recovered by phase separation. The solvent recovered can be used as such, or after a purification operation such as distillation, again as the solvent for separating the phase composed mainly of the heteropoly acid and/or its salt.

By practicing the above-described process of the present invention, heteropoly acids can be removed and recovered efficiently in the form which can be reused, and the heteropoly acid concentration in the polyalkylene ether can be reduced to 0.5 wt. % or less, even 0.01 wt. % or less under optimum practicing conditions.

When the polyalkylene ether reduced or being in concentration of heteropoly acids to 0.5 wt. % or less, respectively with or without a practice of the abovedescribed operation, is further purified to lower the heteropoly acid concentration, the operation of contacting with a solid adsorbent in the co-presence of at least one solvent selected from hydrocarbons having 3 to 15 carbon atoms or halogenated hydrocarbons having 1 to 15 carbon atoms ("a solvent for purification"). The solvent for purification to be co-present may be the same as that used for separating the phase composed mainly of heteropoly acids. Usually, the solvent for purification is added to a polymerizing solution comprising the polyalkylene ether, unreacted monomers and heteropoly acids to separate the phase consisting mainly of heteropoly acids, followed by contact with the solid adsorbent. When the concentration of the dissolved heteropoly acid is low or when the amount of the solvent for purification added is small, the phase consisting of heteropoly acids may sometimes not be separated and, in this case, only the operation of contacting the polymerizing solution with the solid adsorbent is practiced.

The amount of the hydrocarbon or the halogenated hydrocarbon ("a solvent for purification") to be co-present when contacting with the solid adsorbent may be preferably 0.05-fold or more, more preferably 0.5-fold or more of the polyalkylene ether. When an organic solvent such as THF is mixed, it is preferable to add a solvent for purification in an amount at least equal to the amount of the organic solvent. When a polyalkylene ether alone or a small amount of the organic solvent is mixed, the solvent for purification may be phase separated from the polyalkylene ether phase, but the effect is small even if the solvent for purification may be used in an amount to such an extent to cause the phase separation. On the other hand, when the solvent for purification is previously mixed in a suitable amount, it is not particularly required to be added, but it may also be added, if desired.

The kind of the solid adsorbent is not particularly limited, provided that it can adsorb the heteropoly acid and/or its salt, but a preferred example is one or a mixture of two or more selected from (A) activated charcoal, (B) aluminum oxides such as alumina, silicaalumina, etc., (C) oxides, hydroxides or carbonates of magnesium, calcium and rare earth metals and (D) basic ion-exchange resins.

The activated charcoal used is not particularly limited but may be any of coconut shell type, coal type, petroleum type, charcoal type. Also, as for a basic ion-exchange resin, it is not particularly limited but may preferably be of microporous type.

Among them, activated charcoal, alumina and silicaalumina have the advantages of high adsorption ability and being hardly crushable in the case of treatment when the adsorbent is packed in a column. Among solid basic compounds as described above in (C), CaO, Ca(OH)$_2$ and CaC0$_3$ are preferably cheap, but MgO has the advantage of low solubility. A basic ion-exchange resin is lower in adsorption ability as compared with other adsorbents, is required to be used in a large amount and therefore has the drawback that the impurities from the resin may be dissolved out.

The amount of the adsorbent to be used, which may differ depending on the amount of heteropoly acids dissolved, may be 2 to 5000-fold weight, more preferably 10 to 1000-fold weight of the amount of heteropoly acids dissolved. As the amount used is larger, the concentration of heteropoly acids after treatment will be lowered.

The treatment temperature is not particularly limited, but a temperature for an easy operation within the temperature range in which the liquid to be treated has an appropriate viscosity is selected. For example, for polyoxytetramethylene glycol or a copolymerized polyalkylene ether glycol of THF with other cyclic ethers or THF with diols, the temperature may be 20° to 150 ° C., more preferably 30° to 100 ° C.

As the treatment method, there may be employed any of the conventional methods such as the method in which after mixing and stirring the liquid to be treated with adsorbent powder or particles, the adsorbent is separated by filtration, and the method in which the liquid to be treated is passed through a column packed with the adsorbent, and the method may be either batchwise or continuous. The treatment time, which is not particularly limited, may generally be 0.05 to 10 hours, particularly 0.1 to 3 hours. The adsorbent used can be utilized, as long as it has the adsorption capacity, as such or after a regeneration treatment.

After the adsorption treatment, the organic solvent and the solvent for purification co-existing can be evaporated by a distillation at normal or reduced pressure to provide a polyalkylene ether lowered in a concentration of heteropoly acids.

According to the present invention, the concentration of heteropolyacids can be lowered to 0.0001 wt. % or less. Besides, since a dissolution of impurities out of the adsorbent can also be suppressed, by removing the solvent by a distillation, etc. after the adsorption treatment, a polyalkylene ether extremely small in impurities can be obtained.

Such effects may be considered to be attributable by the co-operating action of the above solvent for purification and the adsorbent selected. More specifically, it may be estimated that, through the presence of the solvent for purification, the affinity of the heteropoly acid for a polyalkylene ether is lowered to strengthen the adsorbing action of the adsorbent for the heteropoly acid or its salt, simultaneously with a suppression of a dissolution of the components out of the adsorbent itself. The solvent for purification may also be considered to promote a diffusion of the heteropoly acid toward the surface of adsorbent.

By a practice of the present invention, as already mentioned above, the heteropoly acid and/or its salt dissolved in the polyalkylene ether or the mixture of the polyalkylene ether with the organic solvent can be removed efficiently in the form which can be reused. Further after the treatment with an adsorbent, the concentration of heteropoly acids in the polyalkylene ether can be reduced to 0.0001 wt. % or lower.

After applying the treatment with the adsorbent according to the present process, unreacted monomers such as THF can be recovered by a distillation, whereby a scale formation within the distillation tower can be suppressed.

Further, the polyalkylene glycol treated according to the present process suffers little from a deterioration even when heat is applied and therefore can be distilled by means of a thin film type molecular distillation apparatus at 100° to 180 ° C., more preferably at 120° to 160 ° C., at a reduced pressure preferably of 3 Torr or lower, whereby the organic solvent and the solvent for purification, as a matter of course, and further the linear chain or cyclic oligomer components contained in the polyalkylene glycol can be removed.

EXAMPLE 1

Into a 5.0-liter vessel equipped with a stirring means and a reflux condenser were charged 2.0 kg of THF containing 300 ppm of water and 1.0 kg of 12-tungstophosphoric acid ($H_3PW_{12}O_{40}$ $3H_2O$) controlled to the number of crystal water of 3 by heating in an electric furnace at 150° C. for 2 hours. The reaction system thereby forms two liquid phases, that is, the catalyst liquid phase and the THF phase. Thereafter the stirring was continued at a temperature of 60° C. for 4 hours for a polymerization, the mixture was left to stand to be separated into two liquid phases, and the catalyst phase was recovered as the lower phase. The composition of the THF phase as the upper phase was analyzed to find that 23% by weight of polyoxytetra-methylene glycol (hereinafter abbreviated as "PTMG") and about 2.8% by weight of 12-tungstophosphoric acid were found to be contained. Next, a part of the unreacted THF was recovered to obtain 820 g of a THF solution containing 50% by weight of PTMG. The solution was found to contain 6% by weight of 12-tungstophosphoric acid dissolved therein. To this solution was added 1.0 kg of n-octane, and the mixture after being stirred was left to stand at 30° C. for 30 hours, whereafter the catalyst liquid phase was precipitated to be separated into two layers, with the upper phase becoming colorless and transparent. The weight of the catalyst phase recovered from the lower phase was 91 g, containing about 50% by weight of 12-tungstophosphoric acid, with the balance being PTMG, THF and a very minute amount of n-octane. Subsequently, only THF was recovered by a distillation from the upper phase solution. Within the distillation tower and at the distillations tower bottom, the liquid was not separated into two phases, and no foaming was observed within the distillation tower. The bottom liquid in the distillation tower was withdrawn and left to stand at 40° C., whereby n-octane was phase separated to be recovered in an amount of about 0.8 kg. Then, by removing the n-octane dissolved in PTMG by a distillation at a reduced pressure, PTMG in which the 12-tungstophosphoric acid is reduced to 50 ppm was obtained. The n-octane recovered by a phase separation was used as such and after a distillation as the solvent for precipitation of the heteropoly acid. As the results, in both cases, the solvents had sufficient function of precipitating the heteropoly acid. Further, when the catalyst phase recovered is recycled as the catalyst for polymerization of THF, a polymerization of THF was found to proceed.

In this Example and in the following Examples, a microanalysis of the heteropoly acid or its salt was conducted by analysis of W, Mo, etc. according to the fluorescent X-ray analytical method. It is not clear whether W or Mo remaining minutely in the polyalkylene ether after the adsorption treatment still remains the structure of the original heteropoly acid.

COMPARATIVE EXAMPLE 1

When THF was evaporated by reduced pressure distillation from the THF solution containing 6% by weight of 12-tungsto-phosphoric acid and 50% by weight of PTMG obtained in the same manner as Example 1, no precipitation of the catalyst phase occurred at all, but the existed 12-tungstophosphoric acid was all dissolved in PTMG to give PTMG containing 12% by weight of 12-tungsto-phosphoric acid.

EXAMPLES 2–14

Various solvents as indicted in Table 1 were added to the polymers containing the heteropoly acid or the salt thereof or mixtures containing the said polymers and THF as indicated in Table 1, followed by stirring, and they were left to stand at 30° C. for 50 hours. The catalyst phase sedimented was separated and recovered, and the upper phase was desolventized to provide a polymer reduced in a concentration of the heteropoly acid or its salt. The results are shown in Table 1. As for the n-butane-added system of Example 5, the operation was conducted under a liquefying condition by using a pressure vessel. The PTMG employed in Example 6 contained about 1.0% by weight of water.

EXAMPLE 15

To a mixture comprising about 390 g of PTMG, about 200 g of THF, about 1.0 kg of n-octane and 12-tungstophosphoric acid minutely dissolved therein obtained after the catalyst separation following the operation as described in Example 1, 1.0 g of MgO powder was added, followed by stirring at 40° C. for one hour. Then, after MgO powder was removed with a Teflon membrane filter, most of THF and n-octane were recovered by a reduced pressure distillation. As the next step, by means of a thin film system molecular distillation device, a distillation was carried out at 140° C., 0.1 Torr to evaporate the solvent, the water and the chain and cyclic oligomer components contained in polyoxytetramethylene glycol, whereby a purified PTMG reduced in W content to 0.5 ppm was obtained. THF and n-octane recovered by a distillation were separated in a rectifying tower, and THF was reused as the starting material, while n-octane as the solvent for purification.

COMPARATIVE EXAMPLE 2

When a mixture comprising 390 g of PTMG, 200 g of THF and 50 ppm of 12-tungstophosphoric acid was treated in the same manner as described in Example 15, a PTMG with a W content of 20 ppm was obtained. Further, PTMG was partially depolymerized and lowered in recovery.

EXAMPLES 16–27

Into the compositions as indicated in Table 2, comprising 100 g of a polyalkylene ether and hydrocarbon solvents containing minute amounts of heteropoly acids, predetermined amounts of adsorbents as indicated in Table 2 were added, followed by stirring at 80° C. for one hour. Then, the adsorbent was recovered by filtration, and thereafter the solvent was evaporated by a reduced pressure distillation to provide a polyalkylene ether reduced in W content. The results are shown in Table 2.

TABLE 1

| | Composition of liquid to be treated | | | | Solvent added | | Heteropoly acid |
|---|---|---|---|---|---|---|---|
| | Polymer | | Heteropoly acid | | THF | | Weight | conc. in a puri- |
| Example | Kind | Weight (g) | Kind | Weight (g) | (g) | Kind | (g) | fied polymer (ppm) |
| 2 | PTMG | 200 | $H_3PMo_{12}O_{40}$ | 15 | 150 | iso-octane | 500 | 80 |
| 3 | | 200 | $H_4SiW_{12}O_{40}$ | 10 | 150 | cyclohexane | 500 | 200 |
| 4 | | 200 | $H_4SiMo_{12}O_{40}$ | 15 | 150 | neo-pentane | 500 | 120 |
| 5 | | 200 | $H_3PW_{12}O_{40}$ | 20 | 200 | n-butane | 500 | 200 |
| 6 | | 200 | $H_3PW_{12}O_{40}$ | 20 | 0 | n-octane | 100 | 700 |
| 7 | | 200 | $H_3PW_{12}O_{40}$ | 20 | 0 | n-heptane | 100 | 800 |
| 8 | Ethylene glycol - THF copolymerized polyether | 100 | $H_4SiW_{12}O_{40}$ | 10 | 100 | n-undecane | 250 | 80 |
| 9 | glycol (THF content 95 wt. %) | 100 | $H_3PW_{12}O_{40}$ | 12 | 100 | toluene | 250 | 350 |
| 10 | Neopentyl glycol - THF copolylmerized polyether | 100 | $H_3PMo_{12}O_{40}$ | 8 | 100 | n-hexane | 300 | 110 |
| 11 | glycol (THF content 90 wt. %) | 100 | $H_3PW_{12}O_{40}$ | 18 | 100 | benzene | 250 | 380 |
| 12 | Propylene oxide - THF copolymerized polyether | 100 | $H_4SiW_{12}O_{40}$ | 11 | 150 | Freon-113 | 300 | 200 |
| 13 | glycol (THF content 80 wt. %) | 100 | $H_3PW_{12}O_{40}$ | 13 | 150 | chloroform | 250 | 600 |
| 14 | | 100 | $NaH_2PW_{12}O_{40}$ | 10 | 100 | n-octane | 250 | 500 |

TABLE 2

| | Composition of liquid to be treated by an adsorbent | | | | | | | W or Mo content |
|---|---|---|---|---|---|---|---|---|
| | | Heteropoly-acid | | Solvent for purification | | Adsorbent | | in a purified |
| Example | Polyalkylene glycol (100 g) | Kind | Content (ppm) | Kind | Weight (g) | Kind | Weight (g) | polyalkylene ether (ppm) |
| 16 | Polyoxytetramethylene glycol | $H_3PMo_{12}O_{40}$ | 100 | iso-octane | 30 | Activated charcoal (Calgon CAL) | 5 | 1.8 |
| 17 | | $H_4SiW_{12}O_{40}$ | 150 | cyclohexane | 50 | Activated charcoal (Kreha beads BAC-MQ) | 5 | 1.2 |
| 18 | | $H_3PW_{12}O_{40}$ | 200 | neo-pentane | 30 | CaO powder | 1 | 0.5 |
| 19 | | $H_3PW_{12}O_{40}$ | 150 | n-octane | 30 | $Al_2O_3$ powder | 0.5 | 0.4 |
| 20 | | $H_3PW_{12}O_{40}$ | 150 | n-undecane | 30 | $Al_2O_3$—$SiO_2$ powder | 0.5 | 0.6 |

TABLE 2-continued

| | | Composition of liquid to be treated by an adsorbent | | | | | | W or Mo content in a purified polyalkylene ether (ppm) |
|---|---|---|---|---|---|---|---|---|
| | | Heteropoly-acid | | Solvent for purification | | Adsorbent | | |
| Example | Polyalkylene glycol (100 g) | Kind | Content (ppm) | Kind | Weight (g) | Kind | Weight (g) | |
| 21 | | $H_4SiMo_{12}O_{40}$ | 150 | toluene | 80 | MgO powder | 1 | 2.5 |
| 22 | Ethylene glycol - THF copolymerized polyether glycol (THF content 95 wt. %) | $H_3PMo_{12}O_{40}$ | 180 | n-hexane | 30 | Activated charcoal (Takeda-Shirasagi A powder) | 1 | 0.2 |
| 23 | | $H_3PW_{12}O_{40}$ | 180 | Freon-113 | 50 | $Al_2O_3$ powder | 1 | 1.2 |
| 24 | Neopentyl glycol - THF copolymerized polyether glycol (THF content 90 wt. %) | $H_3PW_{12}O_{40}$ | 150 | chloroform | 100 | Y-zeolite powder | 1 | 2.5 |
| 25 | | $H_4SiW_{12}O_{40}$ | 150 | n-heptane | 30 | Active clay | 1 | 3.5 |
| 26 | Propylene oxide - THF copolymerized polyether glycol (THF content 80 wt. %) | $H_4SiW_{12}O_{40}$ | 160 | n-octane | 30 | $CeO_2$ powder | 1 | 1.0 |
| 27 | | $H_3PW_{12}O_{40}$ | 170 | n-octane | 30 | Basic ion-exchange resin Amberlite IRA-900 | 15 | 5.5 |

EXAMPLE 28

Into a vessel equipped with a stirring means and a reflux condenser were charged 2.0 kg of THF and 85 g of ethylene glycol. Then, 1.0 kg of 12-tungstosilicic acid ($H_4SiW_{12}O_{40}$) heated at 320° C. for 3 hours to be made anhydrous was added thereto. By setting the temperature at 60° C., stirring was continued for 8 hours and the mixture was left to stand at room temperature to be separated into two phases of the catalyst phase and the THF phase. The compositon of the THF phase of the upper phase was analyzed to find that it contained about 61% by weight of THF, about 35% by weight of a polyalkylene ether glycol in which ethylene glycol is copolymerized with THF, about 4% by weight of 12-tungstosilicic acid and about 0.3% by weight of water. To 500 g of this mixture was added 625 g of n-octane, and the resultant mixture was stirred. The turbid mixture in which the heteropoly acid phase was separated was filtered through a Teflon membrane filter to separate the heteropoly acid phase and obtain a colorless and transparent filtrate. Then, the filtrate was passed through a column of 20 cm in length packed with 100 g of granular activated charcoal (CAL produced by Calgon Co.) at a linear velocity of 20 cm/hour. Then, only THF was recovered by a distillation, followed by cooling to 40° C., whereby n-octane was phase separated to be recovered in an amount of 500 g. Subsequently, most of the n-octane dissolved in the polyalkylene ether glycol was recovered by a reduced pressure distillation, and thereafter distilled by means of a thin film type molecular distillation device at 140° C., 0.1 Torr to remove n-heptane, water, linear chain and cyclic oligomer components and other low boiling point impurities, whereby a purified polyalkylene ether glycol comprising a copolymer of THF and ethylene glycol reduced in W content to 0.1 ppm was obtained. The n-octane recovered by a phase separation was distilled and combined with the n-octane recovered by a reduced pressure distillation and utililzed again as the solvent for purification.

We claim:

1. A process for purifying a polyoxytetramethylene ether which comprises the steps of:
   (1) mixing (A) a polyoxytetramethylene ether having a molecular weight of 500 to 5000, or a mixture of said polyoxytetramethylene ether and tetrahydrofuran, propylene oxide, ethylene glycol or neopentyl glycol, with (B) at least one solvent for purification selected from hydrocarbons having 3 to 15 carbon atoms or halogenated hydrocarbons having 1 to 15 carbon atoms; said polyoxytetramethylene ether or said mixture containing a heteropoly acid and/or its salt, said heteropoly acid being an oxy acid formed by condensation of at least one oxide of Mo, W or V with an oxy acid of P, Si, As, Ge, B, Ti, Ce or Co, the atomic ratio of said oxide to said oxy acid being 2.5 to 12; and a salt of an oxy acid; and
   (2) separating the phase composed mainly of said heteropoly acid and/or its salt from the mixture formed in step (1).

2. A process for purifying a polyoxytetramethylene ether wherein (A) a polyoxytetramethylene ether having a molecular weight of 500 to 5000 or a mixture of said polyoxytetramethylene ether and tetrahydrofuran, propylene oxide, ethylene glycol or neopentyl glycol, said polyoxytetramethylene ether or said mixture containing a heteropoly acid and/or its salt; said heteropoly acid being (1) an oxy acid formed by condensation of at least one oxide of Mo, W or V with an oxy acid of P, Si, As, Ge, B, Ti, Ce or Co, the atomic ratio of said oxide to said oxy acid being 2.5 to 12 and (2) a salt of an oxy acid, is brought into contact with (B) a solid adsorbent capable of adsorbing the heteropoly acid and/or its salt in the presence of (C) at least one solvent for purification selected from hydrocarbons having 3 to 15 carbon atoms and halogenated hydrocarbons having 1 to 15 carbon atoms.

3. a process according to claim 1 or claim 2, wherein the polyoxytetramethylene ether or the mixture of polyoxytetramethylene ether and tetrahydrofuran, propylene oxide, ethylene glycol, or neopentyl glycol is a polymerization mixture composed mainly of a polyoxytetramethylene ether having polyoxytetramethylene chains in the molecule and tetrahydrofuran, and the solvent for purification selected from hydrocarbons having 3 to 15 carbon atoms or halogenated hydrocarbons having 1 to 15 carbon atoms is at least one solvent for purification selected from hydrocarbons having not more than 15 carbon atoms which has a boiling point higher than tetrahydrofuran and does not form an azeotropic mixture therewith, tetrahydrofuran is recovered by distillation after separation of the phase composed mainly of the heteropoly acid and/or its salt, and the residual mixture of the said polyalkylene ether and the the said solvent for purification is subjected to phase separation to thereby separate the liquid composed mainly of the said polyalkylene ether from most of the said solvent for purification.

4. A process according to claim 3, wherein the polyoxytetramethylene ether having polyoxytetramethylene chains in the molecule is obtained by a polymerization with the use of the heteropoly acid and/or its salt as a catalyst.

5. A process according to claim 3, wherein the solvent for purification existing in the said polyoxytetramethylene ether is further evaporated.

6. A process according to claim 3, wherein the polyoxytetramethylene ether having polyoxytetramethylene chains in the molecule is polyoxytetramethylene glycol.

7. A process according to claim 3, wherein the polyoxytetramethylene ether or the mixture of polyoxytetramethylene ether and tetrahydrofuran, propylene oxide, ethylene glycol or neopentyl glycol to be purified is brought into contact with a solid adsorbent capable of adsorbing the heteropoly acid and/or its salt at either one of the stage after the phase composed mainly of the heteropoly acid and/or its salt is separated by precipitation by adding at least one solvent for purification selected from hydrocarbons having not more than 15 carbon atoms which has a boiling point higher than tetrahydrofuran and does not form an azeotropic mixture therewith and the stage after further tetrahydrofuran is recovered by distillation or at the both stages thereof.

8. A process according to claim 6, wherein the polyoxytetramethylene ether or the mixture of polyoxytetramethylene ether and tetrahydrofuran, propylene oxide, ethylene glycol or neopentyl glycol to be purified is brought into contact with a solid adsorbent capable of adsorbing the heteropoly acid and/or its salt at either one of the stage after the phase composed mainly of the heteropoly acid and/or its salt is separated by precipitation by adding at least one solvent for purification selected from hydrocarbons having not more than 15 carbon atoms which has a boiling point higher than tetrahydrofuran and does not form an azeotropic mixture therewith and the stage after further tetrahydrofuran is recovered by distillation or at the both stages thereof.

9. A process according to claim 2, wherein the solid adsorbent is one or a mixture of two or more adsorbents selected from:
(A) activated charcoal;
(B) aluminum oxides;
(C) oxides, hydroxides and carbonates of magnesium, calcium and rare earth metals; and
(D) basic ion-exchange resins.

10. A process according to claim 7, wherein the solid adsorbent is one or a mixture of two or more adsorbents selected from:
(A) activated charcoal;
(B) aluminum oxides;
(C) oxides, hydroxides and carbonates of magnesium, calcium and rare earth metals; and
(D) basic ion-exchange resins.

11. A process according to claim 3, wherein, after tetrahydrofuran is recovered by distillation, the solvent for purification which is recovered by the phase separation, either as such or after the purification operation such as distillation, is utilized again as the solvent for purification for separating the phase composed mainly of the heteropoly acid and/or its salt.

12. A process according to claim 7, wherein, after tetrahydrofuran is recovered by distillation, the solvent for purification which is recovered by the phase separation, either as such or after the purification operation such as distillation, is utilized again as the solvent for purification for separating the phase composed mainly of the heteropoly acid and/or its salt.

13. A process according to claim 1 or claim 2, wherein the separated phase composed mainly of the heteropoly acid and/or its salt is reused as the polymerization catalyst.

14. A process according to claim 3, wherein the separated phase composed mainly of the heteropoly acid and/or its salt is reused as the polymerization catalyst.

15. A process according to claim 7, wherein the separated phase composed mainly of the heteropoly acid and/or its salt is reused as the polymerization catalyst.

16. A process according to claim 2, wherein the purified polymer after contact with the solid adsorbent is treated under reduced pressure at a temperature of 100° to 180° C.

17. A process according to claim 7, wherein the purified polymer after contact with the solid adsorbent is treated under reduced pressure at a temperature of 100° to 180° C.

18. A process according to claim 1 or claim 2, wherein the polyoxytetramethylene ether or the mixture of the polyoxytetramethylene ether and tetrahydrofuran, propylene oxide, ethylene glycol or neopentyl glycol containing the heteropoly acid and/or its salt is
(1) the reaction mixture obtained by the polymerization of tetrahydrofuran alone, or the copolymerization of tetrahydrofuran and propylene oxide, ethylene glycol or neopentyl glycol, with the use of the heteropoly acid and/or its salt as a catalyst, and the subsequent removal of the phase containing said catalyst from the reaction mixture (1) when the reaction mixture (1) consists of two phases, one of said phases containing said catalyst or
(2) the concentrated reaction mixture obtained by recovering at least a part of unreacted monomer from reaction mixture (1).

19. A process according to claim 1 or claim 2, wherein the hydrocarbon having 3 to 15 carbon atoms or the halogenated hydrocarbon having 3 to 15 carbon atoms is one or a mixture of two or more selected from pentane, hexane, heptane, octane, nonane, decane, undecane, dodecane, cyclopentane, cyclohexane, cycloheptane, cyclooctane, cyclononane and cyclodecane.

20. A process according to claim 3, wherein the hydrocarbon having not more than 15 carbon atoms which has a boiling point higher than tetrahydrofuran and does not form an azeotropic mixture therewith is one or a mixture of two or more selected from n-heptane, octane and nonane.

21. A process according to claim 7, wherein the hydrocarbon having not more than 15 carbon atoms which has a boiling point higher than tetrahydrofuran and does not form an azeotropic mixture therewith is one or a mixture of two or more selected from n-heptane, octane and nonane.

22. A process according to claim 3, wherein the hydrocarbon having not more than 15 carbon atoms which has a boiling point higher than tetrahydrofuran and does not form an azeotropic mixture therewith is one or a mixture of octane and nonane.

23. A process according to claim 7, wherein the hydrocarbon having not more than 15 carbon atoms which has a boiling point higher than tetrahydrofuran and does not form an azeotropic mixture therewith is one or a mixture of octane and nonane.

24. The process of claim 1 or 2 wherein said tetrahydrofuran, propylene oxide, ethylene glycol or neopentyl glycol contains a small amount of water.

* * * * *